Dec. 4, 1951 F. D. KING 2,577,251
FLOWER HOLDER
Filed Aug. 15, 1949
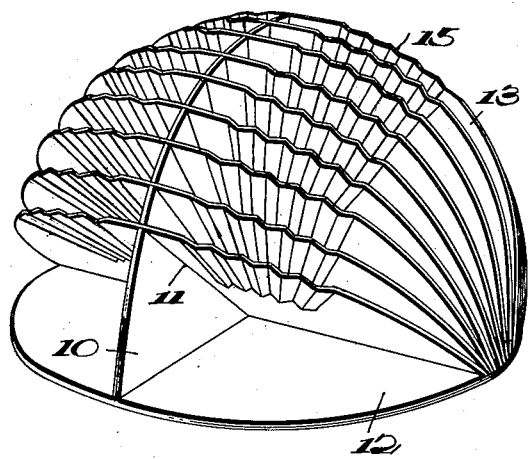
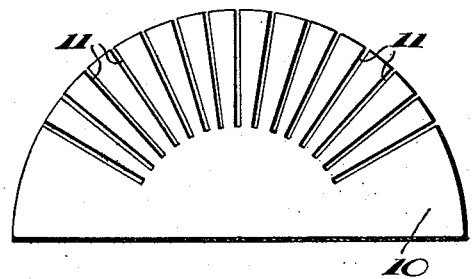
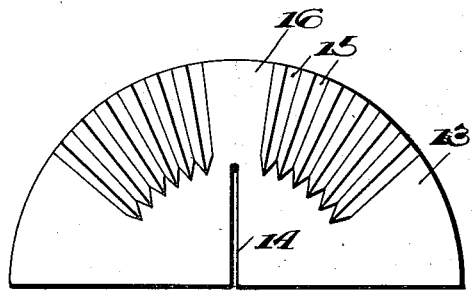
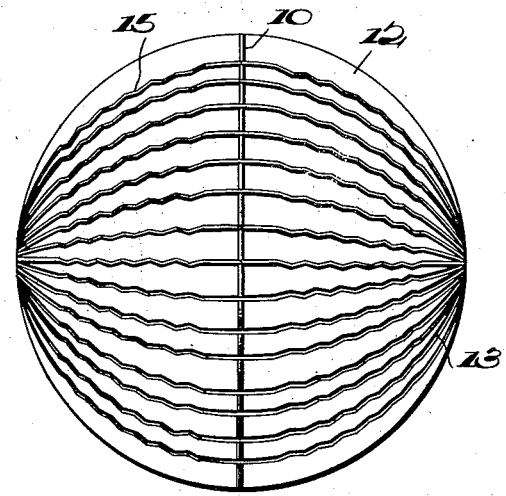
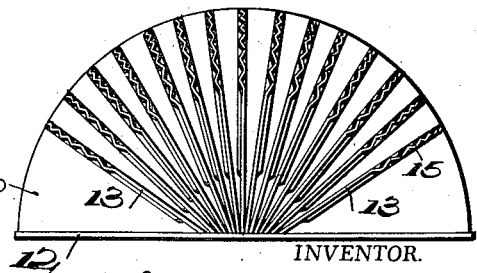
INVENTOR.
Floyd D. King
BY
Cameron, Kerkam + Sutton
Attorneys.

Patented Dec. 4, 1951

2,577,251

UNITED STATES PATENT OFFICE 2,577,251

FLOWER HOLDER

Floyd D. King, Phoenix, Ariz.

Application August 15, 1949, Serial No. 110,374

6 Claims. (Cl. 47—41)

This invention pertains to an improved flower holder or "frog" which is of novel shape and design and which is so constructed as to readily and firmly support cut flowers, regardless of the diameter or length of their stem portions, in any desired pattern.

In the past it has been usual to form flower "frogs" or holders of hemispherical shape provided with a series of perforations designed to receive the stems of cut flowers. With holders of this type the support provided for the flowers is inferior and the range of possible flower patterns is extremely limited. As a further objection to this conventional type of holder is the fact that frequently the water in the bowl or container does not adequately penetrate to the flower stems, resulting in rapid deterioration of the flowers. The need has long been felt for a flower holder which will firmly and positively hold cut flowers in any desired arrangement regardless of the length or diameter of their stems. The present holder answers this need and will securely hold any type of cut flower, regardless of stem diameter, in any desired arrangement.

It is therefore one object of this invention to provide a novel flower holder which will securely hold any type of cut flower, regardless of stem diameter or length.

It is another object of this invention to evolve such a flower holder which is readily adaptable to any desired configuration of the bouquet of cut flowers.

It is a further object of this invention to evolve such a flower holder which is readily and easily assembled and which may be modified as desired to support any size or shape of cut flower bouquet.

Other and further objects of this invention will become apparent as this specification proceeds.

Referring to the drawing,

Fig. 1 is a perspective view of the preferred embodiment of the novel flower holder;

Fig. 2 is a top plan view of the improved flower holder;

Fig. 3 is a side view of the holder with the louvres removed showing the central supporting disc and base;

Fig. 4 is a side view of one of the louvres of the flower holder showing the central slot and the peripheral corrugations; and Fig. 5 is a side view of the flower holder with the louvres in place in the supporting disc, showing the angular disposition of the louvres.

In the drawing, 10 indicates the vertical support disc for the flower holder, which as shown in Fig. 3 preferably comprises a semi-circular disc member formed of metal or any other suitable material which is provided about its upper periphery with a series of angularly disposed slots 11. Slots 11 are preferably of equal length and are arranged at such an angle to each other as to form an intersecting point slightly below the median center of disc 10. Slots 11 are preferably slightly longer than the radius of semi-circular disc 10 and are formed with parallel sides and rectangular lower extremities. Slots 11 may be cut or sawed into disc 10 or may be formed in any other appropriate fashion.

Base 12 is shown rectangularly disposed with respect to disc 10 and appropriately affixed thereto as by soldering, cementing or in any other appropriate fashion. Base 12 is preferably circular in shape, but may be of any other desired shape. Disc 10 is preferably affixed across the center of base 12 and is disposed at right angles thereto in such fashion as to divide base 12 into two equal portions.

Louvres 13 are preferably formed of any suitable material, metal or plastic, and as shown are semi-circular in shape and are provided with a central slot 14 which is preferably cut into them slightly more than half of their radial depth. Corrugations 15 are preferably provided about the upper peripheral extremity of louvres 13 and are so disposed with respect to each other as to provide peripheral channels therein. As shown, peripheral corrugations 15 are disposed about the upper peripheral extremities of louvres 13 and extend into louvres 13 a distance slightly greater than its radius. Corrugations 15 are preferably separated at the upper center of louvre 13 by a central space 16 which is designed to fit within slots 11 of main supporting disc 10.

The improved flower holder is assembled as follows:

Central supporting disc 10 is first suitably affixed to circular base 12 along its diameter and at an angle of 90° thereto. With central supporting disc 10 properly in position with respect to base 12 louvres 13 are inserted into the slots 11 of central disc 10 and are forced downwardly therein until they contact the surface of base 12, the lower portion of supporting disc 10 fitting in slots 14 in louvres 13. Louvres 13 may if desired be cemented or soldered to base 12 or they may be left free for easy removal.

It will be seen that the spaces between louvres 13 become progressively more restricted toward the base of the holder providing progressively more restricted spaces for the insertion of the flower stems. Louvres 13 should be progressively graduated in height from the innermost louvre to the outermost to maintain a uniform outer spherical surface for the holder.

The improved flower holder may be used without base 12 where it is desired to cement it or otherwise affix it to the surface of a bowl or vase. In this case, it is merely necessary to cement or otherwise affix supporting disc 10 to the surface of the bowl or other container in a vertical position and then insert the louvres in the slots of disc 10.

The improved flower holder is preferably used as follows:

The entire holder is first placed in a bowl of water or other container, the water being of such depth as to insure the complete penetration of all stem extremities therein. For most normal usage the water should cover at least the lower one third of the flower holder. With the holder in place in the bowl and the water at the desired level the stems of cut flowers are then inserted between the louvres of the holder to the depth necessary to firmly wedge the extremities of the stems between adjacent louvres. For flowers with large stems it is not necessary to insert the lower extremities of the stem as far into the holder as for flowers with small stems. For example, roses, having a substantial stem diameter would probably be inserted about two thirds of the depth of the louvres at which point the stems would be securely wedged between adjacent louvres. If desired, the flowers may be arranged in the holder prior to placing the holder in the bowl.

The corrugations 15 disposed about the upper peripheries of adjacent louvres provide recesses about the outer periphery thereof in which the stems of individual cut flowers may be rested or supported to assist in holding them in a predetermined desired position. They serve to provide additional support for extremely fine stemmed flowers where such support is needed. It will also be seen that with this novel holder any desired design or arrangement of cut flower may be made at the arranger's will.

By virtue of the fact that adjacent louvres are in contact with each other at the bottom of the holder, extremely fine stemmed cut flowers may be firmly wedged into position at the lower extremities of the louvres and will be held there securely in the constricted space between adjacent louvres. Also, by virtue of the fact that the holder is open at each lateral extremity water will freely penetrate between the louvres to the desired depth.

The device may be made in any desired dimensions depending upon the size of the cut flowers, shrubs or plants to be supported therein. For example, for holding extremely small cut flowers such as violets the device would be made in reduced size, but for holding large, long stemmed roses or other large stemmed sizable cut flowers the size of the holder would be increased proportionately.

In the preferred embodiment of the holder fifteen or more louvres are normally used, but the number of louvres may be varied depending upon the number and type of cut flowers to be supported, and if desired louvres may be removed and added at will.

As has been before stated, the novel holder can be made integral with a flower bowl or container or it may be made as shown as an independent unit with an integral base which can be placed in any type of container.

The invention is susceptible of numerous embodiments without departing from the spirit thereof. Attention is directed to the appended claims for a limitation of its scope.

What is claimed is:

1. In a flower holder, a base, a supporting disc vertically mounted on said base, peripheral slots angularly disposed in said supporting disc about its upper periphery and semi-circular louvre members fitted into said slots in said disc.

2. In a flower holder, a base, a semi-circular disc vertically mounted on said base, peripheral slots disposed about the upper periphery of said disc and slotted louvres fitted into the slots of said disc and bearing against said base at their lower extremities.

3. In a flower holder, a base, a semi-circular disc vertically mounted on said base, slots in said disc about its upper periphery and extending downwardly in said disc an appreciable distance and slotted louvre members fitted into the slots in said disc and bearing against said base at their lower extremities.

4. In a flower holder, a base, a supporting disc vertically mounted on said base, angular slots in the upper peripheral extremity of said supporting disc and louvre members fitted into said slots and bearing against said base.

5. In a flower holder, a base, a semi-circular supporting disc vertically mounted on said base, peripheral slots in said supporting disc angularly disposed to each other and louvre means fitted into said slots and supported on said base.

6. In a flower holder, a circular base, a semi-circular supporting disc vertically mounted on one diameter of said base, angularly disposed slots in the upper extremity of said supporting disc and slotted louvres fitted into said slots in said supporting disc and resting on said base.

FLOYD D. KING.

REFERENCES CITED

The following references are of record in the file of this patent:

UNITED STATES PATENTS

| Number | Name | Date |
| --- | --- | --- |
| D. 96,826 | Estrella | Sept. 10, 1935 |
| D. 148,290 | Dixon | Jan. 6, 1948 |
| 345,510 | Jenkins et al. | July 13, 1886 |
| 1,676,373 | Woltz | July 10, 1928 |